(12) United States Patent
Yang et al.

(10) Patent No.: US 11,470,672 B2
(45) Date of Patent: Oct. 11, 2022

(54) MULTI-CONNECTION RECOVERY METHOD IN NON-ACTIVATED STATE AND DEVICE THEREFOR

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/624,428

(22) PCT Filed: Jul. 21, 2017

(86) PCT No.: PCT/CN2017/093954
§ 371 (c)(1),
(2) Date: Dec. 19, 2019

(87) PCT Pub. No.: WO2019/014948
PCT Pub. Date: Jan. 24, 2019

(65) Prior Publication Data
US 2020/0221525 A1    Jul. 9, 2020

(51) Int. Cl.
*H04W 76/19* (2018.01)
*H04W 52/02* (2009.01)

(52) U.S. Cl.
CPC ........ *H04W 76/19* (2018.02); *H04W 52/0209* (2013.01)

(58) Field of Classification Search
CPC .................................................... H04W 76/19
See application file for complete search history.

(56) References Cited

U.S. PATENT DOCUMENTS

| 2015/0133122 A1 | 5/2015 | Chen |
| 2017/0019945 A1* | 1/2017 | Chiba ............... H04W 76/15 |
| 2018/0270713 A1* | 9/2018 | Park ............... H04W 74/0833 |

FOREIGN PATENT DOCUMENTS

| CN | 102932857 A | 2/2013 |
| CN | 105101253 A | 11/2015 |
| CN | 105191435 A | 12/2015 |
| CN | 105519167 A | 4/2016 |
| CN | 105898894 A | 8/2016 |

(Continued)

OTHER PUBLICATIONS

Ryoo et al. "Energy Efficiency Enhancement with RRC Connection Control for 5G New RAT" IEEE WCNC 2018 (Year: 2018).*

(Continued)

*Primary Examiner* — Basil Ma
(74) *Attorney, Agent, or Firm* — Young Basile Hanlon & MacFarlane, P.C.

(57) ABSTRACT

A method for resume of multi-connection in an inactive state and a device thereof are provided. The method includes: receiving a connection resume request sent by a terminal, and acquiring configuration of at least one node and/or a measurement report of the at least one node; and according to the configuration of the at least one node and/or the measurement report of the at least one node, adding part or all of the at least one node as a secondary node of the terminal.

10 Claims, 6 Drawing Sheets

Receive a connection resume request sent by a terminal, and acquire configuration of at least one node and/or a measurement report of the at least one node. — 101

Add part or all of the at least one node as a secondary node of the terminal according to the configuration of the at least one node and/or the measurement report of the at least one node. — 102

(56) References Cited

FOREIGN PATENT DOCUMENTS

| CN | 106465435 A | 2/2017 |
|---|---|---|
| KR | 20200028901 A | 3/2020 |
| KR | 20200143738 A | 12/2020 |
| RU | 2621180 C2 | 5/2017 |
| WO | 2015116877 A1 | 8/2015 |
| WO | 2015/139763 A1 | 9/2015 |
| WO | 2016138937 A1 | 9/2016 |
| WO | 2016159731 A1 | 10/2016 |
| WO | 2017115452 A1 | 7/2017 |

OTHER PUBLICATIONS

R2-1706348 Oppo "SN connectivity handling in Suspend/Inactive State" 3GPP TSG-RAN2 AH2 Qingdao Jun. 26-29, 2017 (Year: 2017).*
R2-2006351 Samsung "TP for TS 38.331 on IP Address Allocation for IAB nodes" 3GPP WG2 #110-e E-meeting Jun. 1-12, 2020 (Year: 2020).*
European Examination Report for EP Application 17918178.9 dated Jan. 26, 2021. (8 pages).
Canada First Office Action for CA Application 3,065,843 dated Feb. 5, 2021. (5 pages).
Indian Examination Report for IN Application 201917054445 dated Mar. 15, 2021. (6 pages).
Chile First Office Action with English Translation for CL Application 2019003774 dated Mar. 17, 2021. (20 pages).
Korea Office Action with English Translation for KR Application 10-2019-7038333 dated Apr. 1, 2021. (17 pages).
Russia Office Action with English Translation for RU Application 2019140658 dated Sep. 9, 2020.
3GPP TSG-RAN WG2 #98; Hangzhou, P.R. of China, May 15-19, 2017; R2-1705434.
3GPP TSG-RAN WG2 Meeting #98; Hangzhou, China, May 15-19, 2017; R2-1704145.
3GPP TSG RAN WG2 Meeting #98; Hangzhou, China, May 15-19, 2017; R2-1706124.
3GPP TSG-RAN WG4 Meeting #81; Reno, USA, Nov. 14-18, 2016; R4-1609331.
3GPP TSG-RAN NR ad hoc; Athens Greece, Feb. 13-17, 2017; R2-1700744.
EPO search report for Application No. 17918178.9 dated May 29, 2020.
Japanese Office Action with English Translation for JP Application 2019-571012 dated Jun. 8, 2021. (8 pages).
Singapore Invitation to Respond to Written Opinion for SG Application 11201911477Y dated Jul. 19, 2021. (6 pages).
Nokia, Alcatel-Lucent Shanghai Bell, Considerations on fast access inter-site small cells in NR, 3GPP TSG-RAN WG2 Meeting #97bis, R2-1702696, Apr. 3-7, 2017. (11 pages).
OPPO, SN Connectivity Handling in Suspend/Inactive State, 3GPP TSG-RAN2 Meeting AH2, R2-1706348, Jun. 26-29, 2017. (5 pages).
Ericsson, RRC suspend/resume in LTE-NR tight interworking, 3GPP TSG-RAN WG2 NR AH#2, Tdoc R2-1706634 (Revision of R2-1704452), Jun. 27-29, 2017. (5 pages).
Qualcomm Incorporated, MR-DC Mode in Inactive, 3GPP TSG-RAN WG2 Meeting NR ad-hoc 2, R2-1706892, Jun. 27-29, 2017. (8 pages).
Canadian Examination Report for CA Application 3065843 dated Dec. 1, 2021. (5 pages).
Korean Notice of Final Rejection with English Translation for KR Application 1020197038333 dated Oct. 6, 2021. (8 pages).
Taiwan Office Action with English Translation for TW Application 107123978 dated Sep. 24, 2021. (13 pages).
Communication pursuant to Article 94(3) EPC for EP Application 17918178.9 dated Jan. 27, 2022. (7 pages).
Israel First Office Action for IL Application 271099 dated May 25, 2022. (6 pages).
Australian Examination Report for AU Application 2017423877 dated Jun. 21, 2022. (3 pages).
Taiwan Office Action with English Translation for TW Application 107123978 dated May 10, 2022. (9 pages).
Chinese First Office Action with English Translation for CN Application 201780091880.X dated May 16, 2022. (16 pages).

* cited by examiner

MULTI-CONNECTION RECOVERY METHOD IN NON-ACTIVATED STATE AND DEVICE THEREFOR

CROSS-REFERENCE TO RELATED APPLICATION(S)

This application is a 371 application of International Application No. PCT/CN2017/093954, filed on Jul. 21, 2017, the entire disclosure of which is hereby incorporated by reference.

TECHNICAL FIELD

The present disclosure relates to the technical field of mobile communication, in particular to a method for resume of multi-connection in an inactive state and a device thereof.

BACKGROUND

At present, in a communication network, in addition to an idle state and a connection state supported by the existing Long Term Evolution (LTE), a new inactive state is introduced. A main function of the state is to reduce measurement power consumption and signaling switch overhead of a terminal when there is no data transmission on the terminal, and to resume a link connection as soon as possible when there is data transmission on the terminal. When the terminal is in the inactive state, a mobility processing mode is similar to that in the idle state, that is, the cell reselection criterion is used for moving.

In the related art, when the terminal is in a connection state, the network may configure two links and even multi-hop links for communication transmission (i.e., a multi-connection state) for the terminal according to a network deployment condition and capability of the terminal. However, when the terminal needs to enter an inactive state, multiple links should enter an inactive state, and after entering an inactive state, the network releases relevant information of all links for the terminal so as to release the terminal into the inactive state.

However, after the switch from an inactive state to a connection state, in order to enable the terminal to normally provide services, the network needs to reconfigure a connection state for the terminal according to the network deployment condition and the capability of the terminal. A signaling flow of this process is long, and if a large amount of data needs to be sent by the terminal, initial time delay is large, and service efficiency is not high.

SUMMARY

Implementations of the present disclosure provide a method for resume of multi-connection in an inactive state and a device thereof.

In a first aspect of the present disclosure, an implementation of the present disclosure provides a method for resume of multi-connection in an inactive state. The method includes: receiving a connection resume request sent by a terminal, acquiring configuration of at least one node and/or a measurement report of the at least one node; and adding part or all of the at least one node as a secondary node of the terminal according to the configuration of the at least one node and/or the measurement report of the at least one node.

In a second aspect of the present disclosure, another implementation of the present disclosure provides a method for resume of multi-connection in an inactive state. The method includes: sending a connection resume request to a base station; and using part or all of at least one node selected by the base station as a secondary node of the terminal.

Another implementation of the present disclosure provides a base station. The base station includes: a first receiving module used for receiving a connection resume request sent by a terminal; a first acquiring module used for acquiring configuration of at least one node and/or a measurement report of the at least one node; and an adding module used for adding part or all of the at least one node as a secondary node of the terminal according to the configuration of the at least one node and/or the measurement report of the at least one node.

Another implementation of the present disclosure provides a terminal. The terminal includes: a second sending module used for sending a connection resume request to a base station; and a processing module used for using part or all of at least one node selected by the base station as a secondary node of the terminal.

Another implementation of the present disclosure provides a non-transitory computer readable storage medium storing a computer program, wherein when the computer program is executed by a processor, the method for resume of multi-connection in an inactive state according to an implementation in the first aspect of the present disclosure is implemented.

Another further implementation of the present disclosure provides a non-transitory computer readable storage medium storing a computer program, wherein when the computer program is executed by a processor, the method for resume of multi-connection in an inactive state according to an implementation in the second aspect of the present disclosure is implemented.

Additional aspects and advantages of the present disclosure will be given partially in the following descriptions, and become apparent partially from following descriptions, or be learned from the practice of the present disclosure.

BRIEF DESCRIPTION OF DRAWINGS

Above and/or additional aspects and advantages of the present disclosure will become apparent and more easily to understand from the following descriptions of implementations with reference to the drawings.

DETAILED DESCRIPTION

Figure 1A:
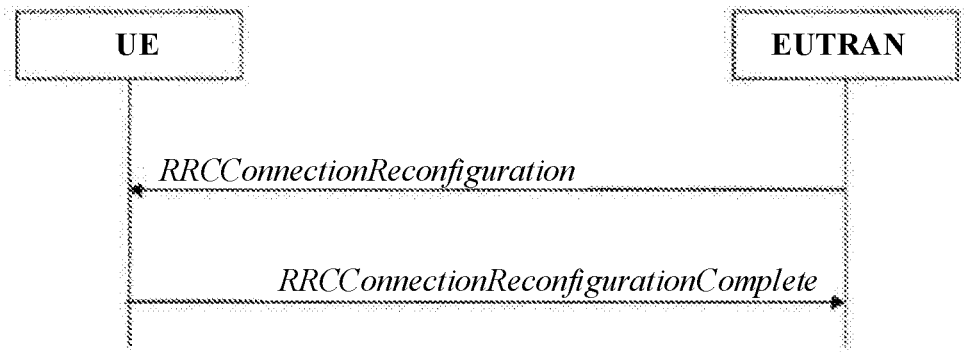
FIG. 1A is a schematic diagram of a communication process in which a base station and a terminal configure multiple nodes according to an implementation of the present disclosure.

Implementations of the present disclosure are described in detail below, examples of the implementations are shown in the accompanying drawings, wherein the same or similar reference numerals refer to the same or similar elements or elements having the same or similar functions throughout. The implementations described below with reference to the drawings are examples and are intended to explain the present disclosure, but should not be construed as limiting the present disclosure.

Based on the analysis of the background technology, it can be known that in the related technology, when a terminal is in an activated state, the terminal will follow indication of a base station to perform relevant measurement. Which frequency in an access network system is measured by the terminal, which neighbor cells are measured, different RATs are measured, when the measurement is performed, what is a quantitative index of the measurement, or the like are uniformly configured by the base station.

Specifically, in the process of a base station configuring measurement to a terminal as shown in FIG. 1A, the base station sends a radio resource control (RRC) connection measurement configuration message through a dedicated control channel (DCCH) to provide measurement configuration for a specific terminal in a connection state. In the connection process as shown in FIG. 1A, the RRCConnectionReconfiguration message sent by the base station to the terminal carries an information element of measurement configuration MeasConfig. The information element is used for indicating what measurement the terminal performs and that the terminal reports the measurement configuration.

Figure 1B:
FIG. 1B is a schematic diagram of a communication process in which a terminal provides a measurement report to a base station according to an implementation of the present disclosure.

Furthermore, after the terminal completes the measurement, as shown in FIG. 1B, the terminal reports a measurement report containing a measurement result to the base station through a MeasurementReport message, and main content carried in the message is an information element of MeasResults.

However, after the terminal enters an inactive state, it will release relevant connection information, for example, will release the above measurement configuration and relevant measurement report. Therefore, once the base station receives the request to resume the connection of the terminal, the base station needs to perform measurement configuration of at least one node on the terminal again, that is, measurement configuration such as an object to be measured, a cell list, a reporting mode, a measurement identifier, a time parameter and so on needs to be generated according to the current conditions of the terminal. The signaling flow of the generation process is long, and if a large amount of data needs to be sent by the terminal, the initial time delay is large.

In fact, in many application scenarios, after the terminal is activated again, communication environment is similar to communication environment in which the terminal was in an activated state before, so the generated measurement configuration has great similarity. For example, when the terminal is in a room all the time, mobility of the terminal is weak, and when the terminal is activated again to enter a connection state, received measurement configuration is substantially the same as that when the terminal was in a connection state before.

Therefore, in the present disclosure, relevant configuration of at least one node related to the terminal is stored in advance, and when the terminal resumes the connection to be in a connection state next time, communication measurement is performed directly according to the stored relevant configuration of the at least one node, thus efficiency of resuming service is greatly improved.

Hereinafter, a method for resume of multi-connection in an inactive state and a device thereof according to an implementation of the present disclosure will be described with reference to the accompanying drawings.

In order to comprehensively describe a method for resume of multi-connection in an inactive state of an implementation of the present disclosure, the following implementations are respectively focused on a base station side and a terminal side for description.

First, a method for resume of multi-connection in an inactive state of an implementation of the present disclosure will be described intensively on a base station side. A base station may be any base station that is capable of communicating with a terminal. A terminal of the implementation of the present disclosure may be a mobile communication device such as a mobile phone, a wearable device, etc. The wearable device may be a smart bracelet, a smart watch, smart glasses, etc.

Figure 2:
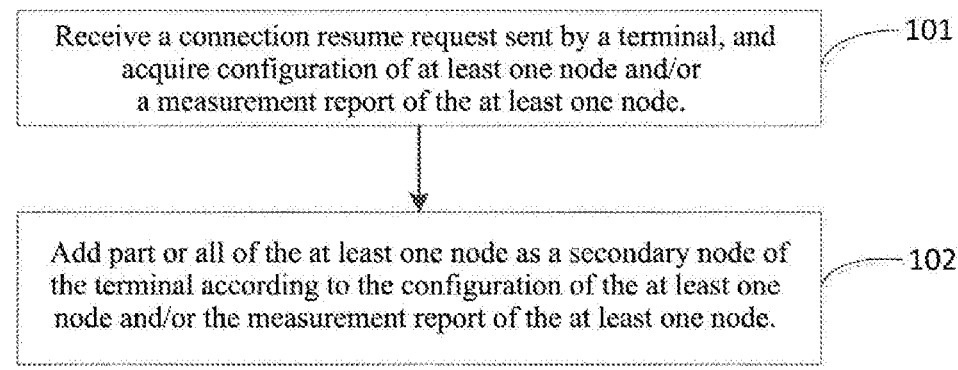
FIG. 2 is a flowchart of a method for resume of multi-connection in an inactive state according to an implementation of the present disclosure.

FIG. 2 is a flowchart of a method for resume of multi-connection in an inactive state according to an implementation of the present disclosure.

Referring to FIG. 2, the method for resume of multi-connection in an inactive state includes following acts 101 and 102.

In act 101, a connection resume request sent by a terminal is received, and configuration of at least one node and/or a measurement report of the at least one node is acquired.

In act 102, part or all of the at least one node is added as a secondary node of the terminal according to the configuration of the at least one node and/or the measurement report of the at least one node.

Based on a communication principle, when the terminal performs a normal communication service, it needs to know relevant information of nodes such as a carrier, a cell and a base station, so that the base station controls the terminal according to the relevant information of the above nodes to perform communication under a relatively good communication condition.

Based on the above analysis, it is a relatively time-consuming process for the base station to generate the measurement configuration of the terminal according to the network deployment and the capability of the terminal and send the measurement configuration for the at least one node to the terminal.

In order to solve this technical problem, in the implementation of the present disclosure, when the terminal enters an inactive state, the configuration of the related nodes to which the terminal was previously connected is stored. It should be noted that, in order to improve efficiency for resuming the terminal from an inactive state to a connection state, the configuration of the nodes in the implementation of the present disclosure does not only refer to the above measurement configuration, but may include at least one of: a node frequency, a node ID, and measurement configuration.

Further, since the configuration of the at least one node corresponding to the terminal is stored, for example, configuration of at least one of a primary node and a secondary node which are configured for the terminal is not deleted (the primary node includes: a primary carrier, a primary cell, or a primary base station, and the secondary node includes: a secondary carrier, a secondary cell, or a secondary base station), it is convenient to directly reuse the stored configuration for the at least one node to the terminal when the terminal enters the activated state again, and directly configure part or all of the at least one node as the secondary node of the terminal according to the stored configuration for the at least one node, without requiring the base station to regenerate the configuration, thus the communication efficiency is greatly improved.

It should be understood that in the actual implementing process, since the communication environment of the terminal changes, when the terminal is resumed from an inactive state to a connection state, nodes added by the base station may be completely the same or not completely the same as the expectation before the terminal enters the inactive state.

Specifically, after receiving a connection resume request sent by the terminal, the base station adds part or all of the at least one node as a secondary node of the terminal.

For example, when the terminal is in a connection state for the nth time (where n is a positive integer greater than 1 or equal to 1), the secondary nodes added by the base station are nodes 1, 2, and 3, when the terminal enters an inactive state, node configuration of the nodes 1, 2, and 3 is stored. When the terminal enters the connection state for the (n+1)th time, the secondary nodes added by the base station may include any combination of the nodes 1, 2, and 3, such as nodes 1 and 2, node 1, or nodes 1, 2, and 3.

The above example is illustrated by taking three secondary nodes as an example when the terminal is in the connection state at the nth time. In practical application, the number of the secondary nodes added for the terminal at each time is different according to different application requirements, for example, the number of the secondary nodes may be 1.

It should be noted that according to different application scenarios, adding part or all of the at least one node as the secondary node of the terminal according to the stored configuration for the at least one node described in the above implementation may be implemented in different ways which are illustrated with following examples.

The First Example:

The base station adds part or all of the at least one node as the secondary node of the terminal only according to the configuration of the at least one node that provides a service to the terminal before the terminal enters the inactive state.

The Second Example:

The base station adds part or all of the at least one node as the secondary node of the terminal only according to the measurement report of the at least one node that provides a service to the terminal before the terminal enters the inactive state.

In this example, the terminal provides the measurement report to the base station after acquiring the stored configuration of the at least one relevant node that provides a connection service for the terminal last time. Content of the measurement report corresponds to the configuration, and may include at least one of: reference signal received power, reference signal received quality, interference signal strength and load information of each node. The base station receives the measurement report and learns that the configuration of the at least one node of the terminal is stored, and adds part or all of the at least one node as the secondary node of the terminal according to the measurement report.

The Third Example:

The base station adds part or all of the at least one node as the secondary node of the terminal according to the measurement report of the at least one node and the configuration of the at least one node that provides a service to the terminal before the terminal enters the inactive state.

Before the terminal enters an inactive state, when there are multiple nodes that provide services to the terminal, the information referred to for adding part or all of the at least one node as the secondary node of the terminal may be various combinations of the above three examples.

For example, before the terminal enters the inactive state, nodes A, B and C provide services to the terminal, relevant nodes may be added as secondary nodes of the terminal according to a measurement report of the node A, configuration of the node B and configuration and a measurement report of the node C.

It should be noted that, according to the different application scenarios, configuration of at least one node may be stored in different main devices, which are illustrated with following examples.

In the first example: the configuration of the at least one node corresponding to the terminal is stored on a base station side.

In this example, since the configuration of the at least one node corresponding to the terminal is stored on the base station side, the corresponding configuration can be directly acquired at the base station side after a request for resuming a connection state from the terminal is received. Compared with the prior art, the base station does not need to regenerate the configuration, thus the resuming efficiency of service providing of the terminal is greatly improved.

In the second example: the configuration of the at least one node corresponding to the terminal is stored on a terminal side.

In this example, a connection resume request sent by the terminal is received, and the connection resume request is analyzed to acquire the configuration and/or the corresponding measurement report of the at least one node.

As the configuration of the corresponding at least one node is directly acquired at the terminal, compared with the prior art, the steps for the base station to generate the configuration and send the configuration to the terminal is omitted, and the efficiency for resuming services is greatly improved.

In the third example: the configuration of the at least one node corresponding to the terminal is stored on a network side.

In this example, since the configuration of the at least one node corresponding to the terminal is stored on the network side, the corresponding configuration of the at least one node can be directly acquired on the network side after the request for resuming the connection from the terminal is received. Compared with the prior art, the steps for the base station to generate the configuration and send the configuration to the terminal is omitted, and the efficiency for resuming services is greatly improved.

In the fourth example: the configuration of the at least one node corresponding to the terminal is stored on multiple sides.

In this example, the configuration of the at least one node corresponding to the terminal may be stored on multiple sides in order to avoid the loss of the configuration of the at least one node caused by erroneous deletion or accidental coverage of information, etc., when the configuration of the at least one node is stored on one side.

For example, the configuration of the at least one node corresponding to the terminal is stored on both the terminal side and the base station side, or the configuration of the at least one node corresponding to the terminal is stored on both the terminal side and the network side, or the configuration of the at least one node corresponding to the terminal is stored on both the network side and the base station side, or the configuration of the at least one node corresponding to the terminal is stored on all of the network side, the terminal side and the base station side.

For storing modes shown in the above four examples, on which side of main device the configuration of the corresponding at least one node is stored may be determined actively and passively according to different specific application requirements.

As a possible implementation, the main device that stores the configuration of the corresponding at least one node may be actively determined.

In the first example, the terminal is designated as a main device that stores the configuration of the at least one node, an indication for entering an inactive state is sent to the terminal, and the indication includes indicating the terminal to store the configuration of the at least one node.

In the second example, the base station side is designated as a main device that stores the configuration of the at least one node, the generated configuration of the at least one node may be stored.

In the third example, the network side is designated as a main device that stores the configuration of the at least one node. After the terminal enters an inactive state, the network side acquires and stores the configuration of the corresponding at least one node from the base station or the terminal.

The implementations in which main devices of multiple sides are designated as apparatuses that store the corresponding measurement may refer to the above three examples, and will not be described in detail herein.

As another possible implementation, the main device that stores the configuration of the corresponding at least one node may be passively determined.

In this example, considering that in some scenarios, the terminal, the network or the base station may not be suitable for storing the configuration, for example, the terminal has little free memory, and the current load of the base station is large, in this case, it is obviously inappropriate to rigidly designate a main device. Therefore, the main device storing the relevant configuration may be determined according to the specific condition of the terminal or the base station.

For example, device information reported by the terminal, such as current free memory of the terminal, a CPU operation speed, etc., is acquired to determine the main device that stores the configuration of the at least one node according to the device information. If the current free memory of the terminal is little, the base station is determined to be the main device that stores the relevant configuration, so that when being resumed to an activated state, the terminal acquires the configuration of the at least one node from the corresponding main device.

In the actual execution process, if the terminal is in a multi-connection state, regardless of whether the primary node or the secondary node receives the corresponding measurement report, part or all of the at least one node is added as a secondary node of the terminal according to the configuration of the at least one node and/or the measurement report of the at least one node.

In an implementation of the present disclosure, if a primary node acquires the measurement report corresponding to the configuration of the at least one node, a connection with a secondary node is configured for the terminal according to the measurement report and notified to the corresponding secondary node.

In an implementation of the present disclosure, if a secondary node acquires the measurement report corresponding to the configuration of the at least one node, a connection between the secondary node and the terminal is resumed according to the content of measurement report.

Further, based on the above implementation, in order to more clearly describe the effect that the terminal of the implementation of the present disclosure can be quickly resumed to the serving level, following examples are illustrated in which different main devices respectively store the configuration of the corresponding at least one node.

As an example, a terminal stores configuration of at least one node.

In this example, a connection resume request sent by the terminal is received, the connection resume request is analyzed to acquire the configuration of the at least one node, and part or all of the at least one node is added as a secondary node of the terminal according to the configuration of the at least one node.

Alternatively, a connection resume request sent by the terminal is received, the connection resume request is analyzed to acquire a measurement report corresponding to the configuration of the at least one node, and part or all of the at least one node is added as a secondary node of the terminal according to the measurement report corresponding to the configuration of the at least one node.

Alternatively, a connection resume request sent by the terminal is received, the connection resume request is analyzed, the connection resume request sent by the terminal is analyzed to acquire a measurement report corresponding to the configuration of the at least one node, and part or all of the at least one node is added as a secondary node of the terminal according to the configuration of the at least one node and the corresponding measurement report.

As another example, a base station stores configuration of at least one node.

In this example, a connection resume request sent by the terminal is received, the configuration of the at least one node is acquired from the base station, and part or all of the nodes are added as secondary nodes of the terminal according to the configuration of the at least one node.

Alternatively, a connection resume request sent by the terminal is received, the connection resume request is analyzed to acquire a measurement report corresponding to the configuration of the at least one node, and part or all of the at least one node is added as a secondary node of the terminal according to the measurement report corresponding to the configuration of the at least one node.

Alternatively, the configuration of the at least one node is acquired from the base station, a connection resume request sent by the terminal is analyzed to acquire a measurement report corresponding to the configuration of the at least one node, and part or all of the at least one node is added as a secondary node of the terminal according to the configuration of the at least one node and the corresponding measurement report.

As another example, a terminal and a base station both store configuration of at least one node.

In this example, a connection resume request sent by the terminal is received, the configuration of the at least one node is acquired from the base station, and part or all of the nodes are added as secondary nodes of the terminal according to the configuration of the at least one node.

Alternatively, a connection resume request sent by the terminal is received, the connection resume request is analyzed to acquire the configuration of the at least one node, and part or all of the nodes are added as secondary nodes of the terminal according to the configuration of the at least one node.

Alternatively, a connection resume request sent by the terminal is received, the connection resume request is analyzed to acquire a measurement report corresponding to the configuration of the at least one node, and part or all of the at least one node is added as a secondary node of the terminal according to the measurement report corresponding to the configuration of the at least one node.

Alternatively, configuration of the at least one node is acquired from the base station, a connection resume request sent by the terminal is analyzed to acquire a measurement report corresponding to the configuration of the at least one node, and part or all of the at least one node is added as a secondary node of the terminal according to the configuration of the at least one node and the corresponding measurement report.

Alternatively, a connection resume request sent by the terminal is analyzed to acquire a measurement report corresponding to configuration of the at least one node and at least one configuration, and part or all of the at least one node is added as a secondary node of the terminal according to the configuration of the at least one node and the corresponding measurement report.

Therefore, in the implementations of the present disclosure, after the connection resume request sent by the terminal is received, the configuration of the corresponding at least one node is acquired from the main device that stores the configuration of the at least one node, and the configuration of the at least one node stored in different main devices is reused to resume the terminal to a multi-connection state according to the configuration of the at least one node and/or the measurement report corresponding to the configuration of the at least one node, which has high flexibility and is convenient to guarantee that related services of the terminal can be quickly resumed.

In the method for resume of multi-connection in an inactive state, a connection resume request sent by a terminal is received, configuration of at least one node and/or a measurement report of the at least one node is acquired, and part or all of the at least one node is added as a secondary node of the terminal according to the configuration of the at least one node and/or the measurement report of the at least one node. After the terminal enters an inactive state, when a multi-connection state needs to be resumed, the multi-connection state can be resumed as soon as possible, and it is guaranteed that the terminal can be quickly resumed to the serving level.

Secondly, a method for resume of multi-connection in an inactive state according to an implementation of the present disclosure will be described intensively on a terminal side.

Figure 3:
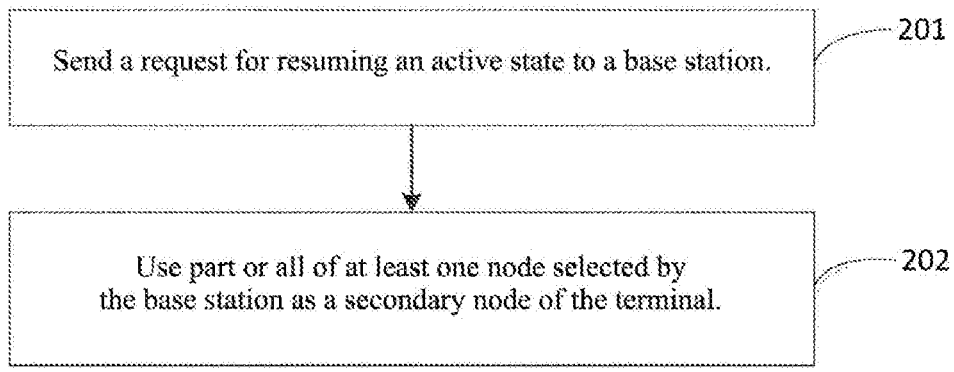
FIG. 3 is a flowchart of a method for resume of multi-connection in an inactive state according to another implementation of the present disclosure.

FIG. 3 is a flowchart of a method for resume of multi-connection in an inactive state according to another implementation of the present disclosure. As shown in FIG. 3, the method includes following acts 201, and 202.

In act 201, a connection resume request is sent to a base station.

In act 202, part or all of at least one node selected by the base station are used as a secondary node of the terminal.

Specifically, in order to resume services of the terminal, the terminal sends the connection resume request to the base station, and uses part or all of the at least one node selected by the base station as a secondary node of the terminal.

As an implementation, configuration of the at least one node is sent to the base station, and the base station selects part or all of the at least one node as the secondary node of the terminal according to the configuration of the at least one node.

As an implementation, a measurement report of the at least one node is sent to the base station, and the base station selects part or all of the at least one node as the secondary node of the terminal according to the measurement report of the at least one node.

As another implementation, a measurement report of the at least one node and configuration of the at least one node are sent to the base station, and the base station selects part or all of the at least one node as the secondary node of the terminal according to the measurement report of the at least one node and the configuration of the at least one node.

In the actual execution process, in the process of sending the connection resume request to the base station, the terminal may or may not specify a secondary node to be connected according to a current service requirement.

In the first example, a secondary node is not specified, to which the terminal is connected after a connection is resumed.

In this example, the base station selects part or all of the nodes as the secondary nodes of the terminal according to the configuration of the at least one node and/or the measurement report of the at least one node, and according to the measurement report, the base station actively performs this selection to provide relevant services for the terminal.

For example, when the at least one node includes nodes 1, 2 and 3, the base station selects all the nodes 1, 2 and 3 as the secondary nodes of the terminal according to the configuration of the at least one node and/or the measurement report of the at least one node, so that the terminal can normally provide relevant services based on all the selected nodes. Alternatively, according to the configuration of the at least one node and/or the measurement report of the at least one node, the base station selects, nodes 1 and 2 in all the nodes as the secondary nodes of the terminal based on services provided by the terminal.

In the second example, a secondary node is specified, to which the terminal would connect after a connection is resumed.

In this example, a secondary node resume request is sent to the base station, wherein the request includes configuration of the at least one node and/or a measurement report of the at least one node. The configuration stored for the terminal by the base station as a secondary node according to the configuration of the at least one node and/or the measurement report of the at least one node is received, so that a relevant secondary node can be configured as a secondary node of the terminal after the connection is resumed.

For example, a resume request of secondary nodes 1 and 2 is sent to the base station. The request includes configuration of the at least one node and/or a measurement report of the at least one node. The base station stores configuration of the secondary nodes 1 and 2 for the terminal according to the configuration of the at least one node and/or the measurement report of the at least one node, so that the secondary nodes 1 and 2 are used as the secondary nodes of the terminal to provide relevant services after the connection is resumed.

It should be emphasized that, the above two examples are merely for the purpose of embodying the present disclosure. The configuration of the secondary node is performed for current terminal based on pre-stored node configuration of the terminal. In the actual execution process, the secondary nodes added by the base station for the terminal may include other nodes in addition to the at least one node that previously provides a service for the terminal. For example, in the above second example, the secondary nodes added by the base station for communication of the terminal may include node 4 in addition to the above secondary nodes 1 and 2, wherein the node 4 does not belong to one of the at least one node that previously provides a service for the terminal.

It should be noted that the configuration of the at least one node may be stored in advance in order to resume the connection state of the terminal more quickly.

According to different specific application requirements, the configuration of the at least one node corresponding to the terminal may be stored in different main devices, which are illustrated with following examples:

In the first example: the configuration of the at least one node is stored on a terminal side.

In the second example: the configuration of the at least one node corresponding to the terminal is stored on a base station side.

In the third example: the configuration of the at least one node corresponding to the terminal is stored on multiple sides.

In this example, the configuration of the at least one node corresponding to the terminal is stored on both the terminal side and the base station side, or the configuration of the at least one node corresponding to the terminal is stored on both the terminal side and the network side, or the configuration of the at least one node corresponding to the terminal is stored on both the network side and the base station side, or the configuration of the at least one node corresponding to the terminal is stored on all the network side, the terminal side and the base station side.

For storing modes shown in the above examples, on which side of main device the configuration of the corresponding at least one node is stored may be determined actively and passively according to different specific application requirements.

As a possible implementation, the main device that stores the configuration of the corresponding at least one node may be actively determined.

In this example, if the terminal is designated as a main device that stores the configuration of the at least one node, an indication for entering an inactive state sent by the base station is received, wherein the indication includes indicating the terminal to store configuration of at least one node corresponding to the terminal.

As another possible implementation, the main device that stores the configuration of the corresponding at least one node may be passively determined. In this example, considering that in some scenarios, the terminal, the network or the base station may not be suitable for storing the configuration, for example, the terminal has little free memory, and current load of the base station is large, etc., in this case, it is obviously inappropriate to rigidly designate a main device. Therefore, the main device storing the relevant configuration may be determined according to specific condition of the terminal or the base station.

It should be noted that the above method for resume of multi-connection in an inactive state described intensively on the base station side corresponds to the method for resume of multi-connection in an inactive state described intensively on the terminal side. The details which are not descried in the terminal side in the implementations will not be repeated here.

In conclusion, in the method for resume of multi-connection in an inactive state according to the implementations of the present disclosure, the connection resume request is sent to the base station, part or all of the at least one node selected by the base station is used as a secondary node of the terminal. Therefore, after the terminal enters an inactive state, when a multi-connection state is needed, the multi-connection state can be resumed as soon as possible, and it is guaranteed that the terminal can be quickly resumed to the serving level.

Figure 4:
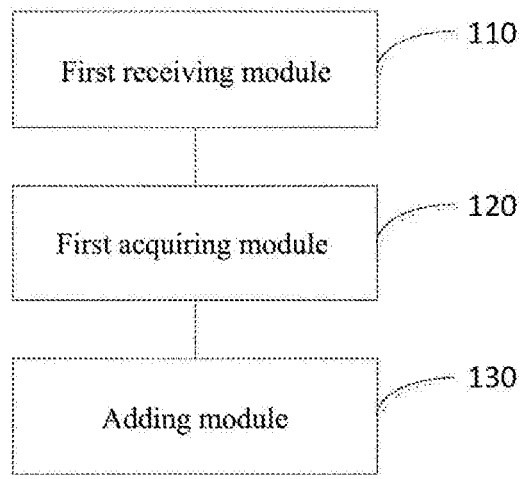
FIG. 4 is a block diagram of structure of a base station according to an implementation of the present disclosure.

In order to realize the above implementations, the present disclosure provides a base station. FIG. 4 is a block diagram of structure of a base station according to an implementation of the present disclosure. As shown in FIG. 4, the base station includes a first receiving module 110, a first acquiring module 120, and an adding module 130.

The first receiving module 110 is used for receiving a connection resume request sent by a terminal.

The first acquiring module 120 is used for acquiring configuration of at least one node and/or a measurement report of the at least one node.

The adding module 130 is used for adding part or all of the at least one node as a secondary node of the terminal according to the configuration of the at least one node and/or the measurement report of the at least one node.

In an implementation of the present disclosure, when a primary node acquires the measurement report corresponding to the configuration of the at least one node, the adding module 130 configures a connection with a secondary connection for the terminal and notifies the corresponding secondary node.

In an implementation of the present disclosure, when a secondary node acquires the measurement report corresponding to the configuration of the at least one node, the adding module 130 resumes a connection between the terminal and the secondary node.

Figure 5:
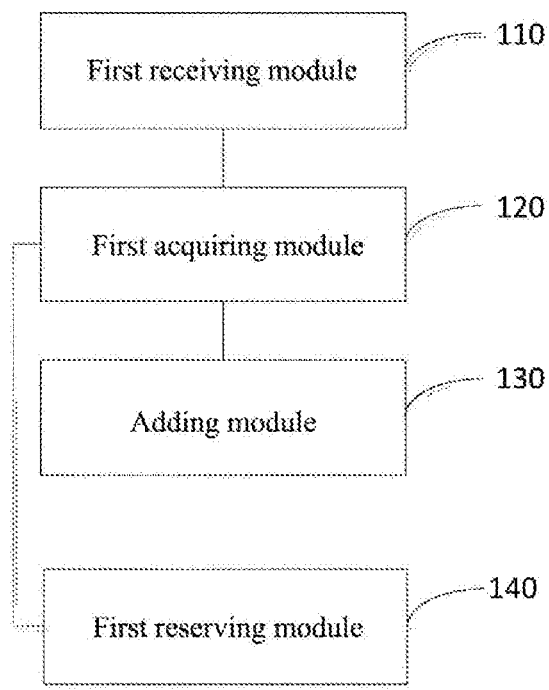
FIG. 5 is a block diagram of structure of a base station according to another implementation of the present disclosure.

It should be understood that, as shown in FIG. 5, on the basis as shown in FIG. 4, the base station further includes a first storing module 140 used for storing the configuration of the at least one node corresponding to the terminal when the terminal enters an inactive state.

According to different specific application scenarios, the first storing module 140 may store the configuration of the at least one node corresponding to the terminal in different main devices, which are illustrated with following examples.

The First Example:

The first storing module 140 is used for storing the configuration of the at least one node corresponding to the terminal on a base station side.

The Second Example:

The first storing module 140 is used for storing the configuration of the at least one node corresponding to the terminal on a terminal side.

The Third Example:

The first storing module 140 is used for storing the configuration of the at least one node corresponding to the terminal on a network side.

Figure 6:
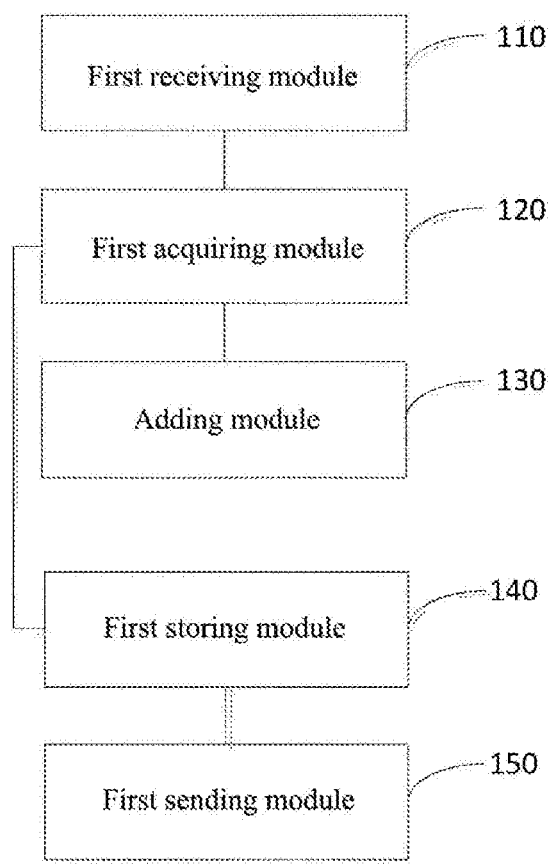
FIG. 6 is a block diagram of structure of a base station according to a yet another implementation of the present disclosure.

In an implementation of the present disclosure, as shown in FIG. 6, on the basis as shown in FIG. 5, the base station further includes a first sending module 150 used for sending the terminal an indication for entering an inactive state, wherein the indication includes indicating the terminal to store the configuration of the at least one node. In other words, in this example, the base station can actively indicate the terminal to store the configuration of the at least one node.

The configuration of the at least one node includes at least one of: a node frequency, a node ID and measurement configuration. The measurement report includes: one or more of reference signal received power, reference signal received quality, interference signal strength and load information of each node.

Figure 7:
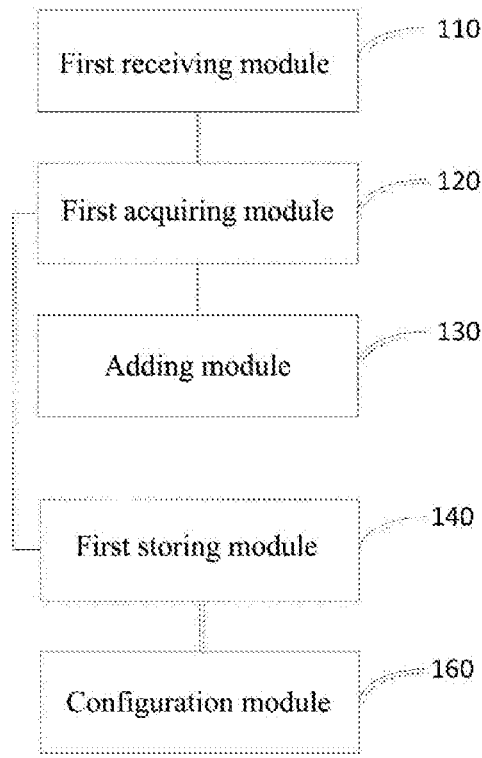
FIG. 7 is a block diagram of structure of a base station according to a still another implementation of the present disclosure.

In an implementation of the present disclosure, as shown in FIG. 7, on the basis as shown in FIG. 5, the base station further includes a configuration module 160 used for configuring for the terminal configuration of at least one node of a primary node and/or configuration of at least one node of a secondary node before storing configuration of the at least one node corresponding to the terminal.

The primary node includes: a primary carrier, a primary cell, or a primary base station, and the secondary node includes: a secondary carrier, a secondary cell, or a secondary base station.

According to different main devices which store the configuration of the at least one node, different modes may be adopted for resuming the multi-connection state of the terminal.

As an example, when the terminal stores the configuration of the at least one node, the first acquiring module 120 is used for, according the connection resume request sent by the terminal received by the receiving module 110, analyzing the connection resume request to acquire the configuration and/or a corresponding measurement report of the at least one node.

As an example, the base station stores the configuration of the at least one node.

In this example, the first acquiring module 120 is used for acquiring the configuration of the at least one node from the base station, and the adding module 130 is used for adding part or all of the nodes as the secondary nodes of the terminal according to the configuration of the at least one node.

Alternatively, the first receiving module 110 is used for receiving the connection resume request sent by the terminal, the first acquiring module 120 is used for analyzing the connection resume request to acquire the measurement report corresponding to the configuration of the at least one node, and the adding module 130 is used for adding part or all of the at least one node as the secondary node of the terminal according to the measurement report corresponding to the configuration of the at least one node.

Alternatively, the first acquiring module 120 is used for acquiring the configuration of the at least one node from the base station, and analyzing the connection resume request sent by the terminal to acquire the measurement report corresponding to the configuration of the at least one node, and the adding module 130 is used for adding part or all of the at least one node as the secondary node of the terminal according to the configuration of the at least one node and the corresponding measurement report.

It should be noted that the explanation of the above implementation of the method for resume of multi-connection in an inactive state on the base station side is applicable to the base station of this implementation, and its implementation principle and technical effect are similar, and will not be repeated here.

Figure 8:
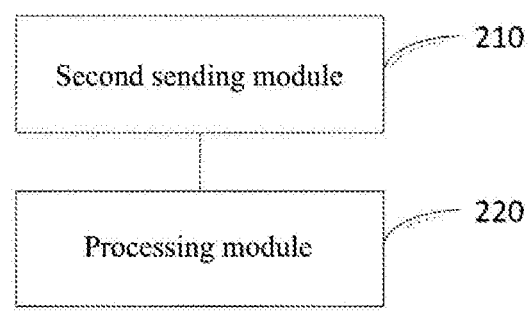
FIG. 8 is a schematic diagram of structure of a terminal according to an implementation of the present disclosure.

In order to realize the above implementations, the present disclosure provides a terminal. FIG. 8 is a schematic diagram of structure of a terminal according to an implementation of the present disclosure. As shown in FIG. 8, the terminal includes a second sending module 210 and a processing module 220.

The second sending module 210 is used for sending a connection resume request to a base station.

The processing module 220 is used for using part or all of at least one node selected by the base station as a secondary node of the terminal.

In the actual execution process, the second sending module 210 is used for sending configuration of at least one node and/or a measurement report of the at least one node to the base station.

Figure 9:
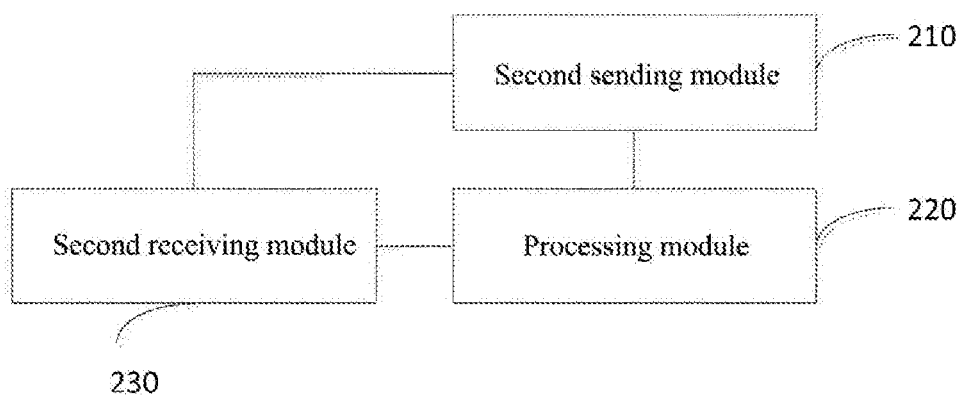
FIG. 9 is a schematic diagram of structure of a terminal according to another implementation of the present disclosure.

It should be understood that, in an implementation of the present disclosure, as shown in FIG. 9, on the basis as shown in FIG. 8, the terminal further includes a second receiving module 230. In this implementation, the second receiving module 230 is used for receiving an indication for entering an inactive state sent by the base station, wherein the indication includes indicating the terminal to store configuration of at least one node corresponding to the terminal.

Figure 10:
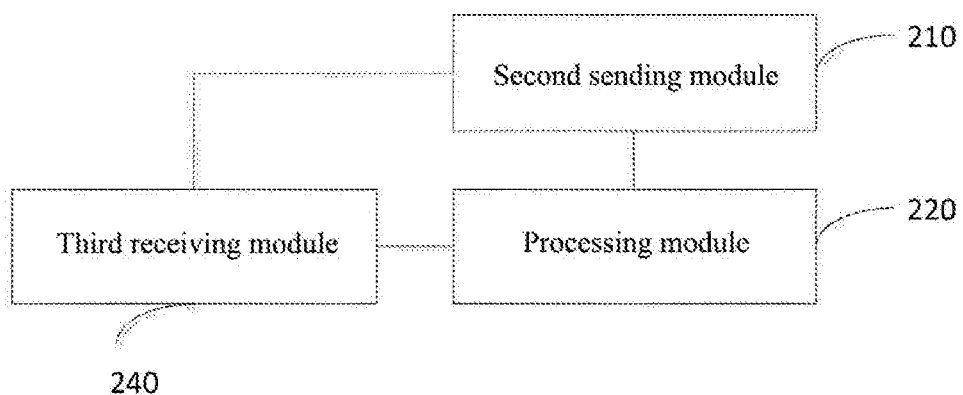
FIG. 10 is a schematic diagram of structure of a terminal according to a yet another implementation of the present disclosure.

The terminal may specify a secondary node for resuming a service according to a service requirement. As shown in FIG. 10, on the basis as shown in FIG. 8, the terminal may further include a third receiving module 240. In this implementation, the second sending module 210 is further used for sending a secondary node resume request to the base station, wherein the request includes configuration of the at least one node and/or a measurement report of the at least one node. Moreover, the third receiving module 240 is used for receiving configuration of the secondary node of the terminal sent by the base station.

It should be noted that the explanation of the above implementation of the method for resume of multi-connection method in an inactive state on the terminal side is applicable to the terminal of this implementation, and its implementation principle and technical effect are similar, and will not be repeated here.

In order to realize the above implementations, the present disclosure provides a non-transitory computer readable storage medium storing a computer program, wherein when the computer program is executed by a processor, the method for resume of multi-connection in an inactive state described intensively on the base station side according to the above implementations is implemented. The description of the method for resume of multi-connection method in an inactive state may refer to the description of the above-mentioned implementations and will not be repeated here.

In order to realize the above implementations, the present disclosure also provides a non-transitory computer readable storage medium storing a computer program, wherein when the computer program is executed by a processor, the method for resume of multi-connection method in an inactive state described intensively on the terminal side according to the above implementations is implemented. The description of the method for resume of multi-connection in an inactive state may refer to the description of the above-mentioned implementations and will not be repeated here.

In the description of this specification, description made with reference to terms "an implementation," "some implementations," "examples," "specific examples," or "some examples" and the like means that a specific feature, structure, material, or characteristic described in connection with the implementations or examples is included in at least one implementation or example of the present disclosure. In this specification, the schematic representations of the above terms are not necessarily directed to the same implementation or example. Furthermore, the specific features, structures, materials, or characteristics described may be combined in any one or at least one implementation or example in a suitable manner. In addition, those skilled in the art may combine the different implementations or examples and the features of the different implementations or examples described in this specification without contradicting each other.

Although implementations of the present disclosure have been shown and described above, it can be understood that the above-mentioned implementations are examples and cannot be understood as limitations of the present disclosure, and those skilled in the art can make changes, modifications, substitutions and variations to the above-mentioned implementations within the scope of the present disclosure.

What we claim is:

1. A method for resume of multi-connection in an inactive state, comprising:
   receiving a connection resume request sent by a terminal, and acquiring configuration of at least one other node, wherein the connection resume request is used for resuming the terminal from the inactive state to an active state;
   analyzing the configuration for load information of the at least one other node; and
   selecting part or all of the at least one other node as a secondary node of the terminal according to the load information of the at least one other node, wherein the configuration comprising a node identification (ID) and the load information of the newly selected secondary node is stored at the terminal when an indication for entering the inactive state is sent to the terminal.

2. The method of claim 1, wherein the configuration of the at least one other node is stored on the terminal according to at least one of a size of free memory in the terminal or load of a base station.

3. A method for resume of multi-connection in an inactive state, comprising:
   sending a connection resume request to a base station comprising at least one configuration of at least one other node, wherein the connection resume request is used for resuming a terminal from the inactive state to an active state and the at least one configuration is analyzed by the base station for load information of the at least one other node; and
   using part or all of the at least one other node selected by the base station as a secondary node of a terminal, wherein the part or all of the at least one other node is selected by the base station according to the load information of the at least one other node, and wherein the configuration comprising a node identification (ID) and the load information of the newly selected secondary node is stored at the terminal when an indication for entering the inactive state is received from the base station.

4. The method of claim 3, further comprising:
   sending a secondary node resume request to the base station, wherein the request comprises at least one of configuration of the at least one other node or a measurement report of the at least one other node; and
   receiving configuration of the secondary node of the terminal sent by the base station.

5. The method of claim 3, wherein the configuration of the at least one other node is stored on the terminal according to at least one of a size of free memory in the terminal or load of a base station.

6. A base station, comprising:
   a memory used for storing a computer program;
   a processor used for executing the computer program to perform acts of:
      receiving a connection resume request sent by a terminal, wherein the connection resume request is used for resuming the terminal from the inactive state to an active state;
      acquiring configuration of at least one other node;
      analyzing the configuration for load information of the at least one other node; and
      selecting part or all of the at least one other node as a secondary node of the terminal according to the load information of the at least one other node, wherein the configuration comprising a node identification (ID) and the load information of the newly selected secondary node is stored at the terminal when an indication for entering the inactive state is sent to the terminal.

7. The base station of claim 6, wherein the configuration of the at least one other node is stored on the terminal according to at least one of a size of free memory in the terminal or load of the base station.

8. A terminal, comprising:
   a memory used for storing a computer program;
   a processor used for executing the computer program to perform acts of:
      sending a connection resume request to a base station containing at least one configuration of at least one other node, wherein the connection resume request is used for resuming the terminal from the inactive state to an active state and the at least one configuration is analyzed by the base station for load information of the at least one other node; and
      using part or all of the at least one node selected by the base station as a secondary node of the terminal, wherein the at least one other node is selected by the base station according to the load information of the at least one other node, wherein the configuration comprising a node identification (ID) and the load information of the newly selected secondary node is stored at the terminal when an indication for entering the inactive state is received from the base station.

9. The terminal of claim 8, wherein the processor is used for executing the computer program to perform acts of:
   sending a secondary node resume request to the base station, wherein the request comprises at least one of configuration of the at least one other node or measurement report of the at least one other node; and
   receiving configuration of the secondary node of the terminal sent by the base station.

10. The method of claim 8, wherein the configuration of the at least one other node is stored on the terminal according to at least one of a size of free memory in the terminal or load of a base station.

* * * * *